2,513,360

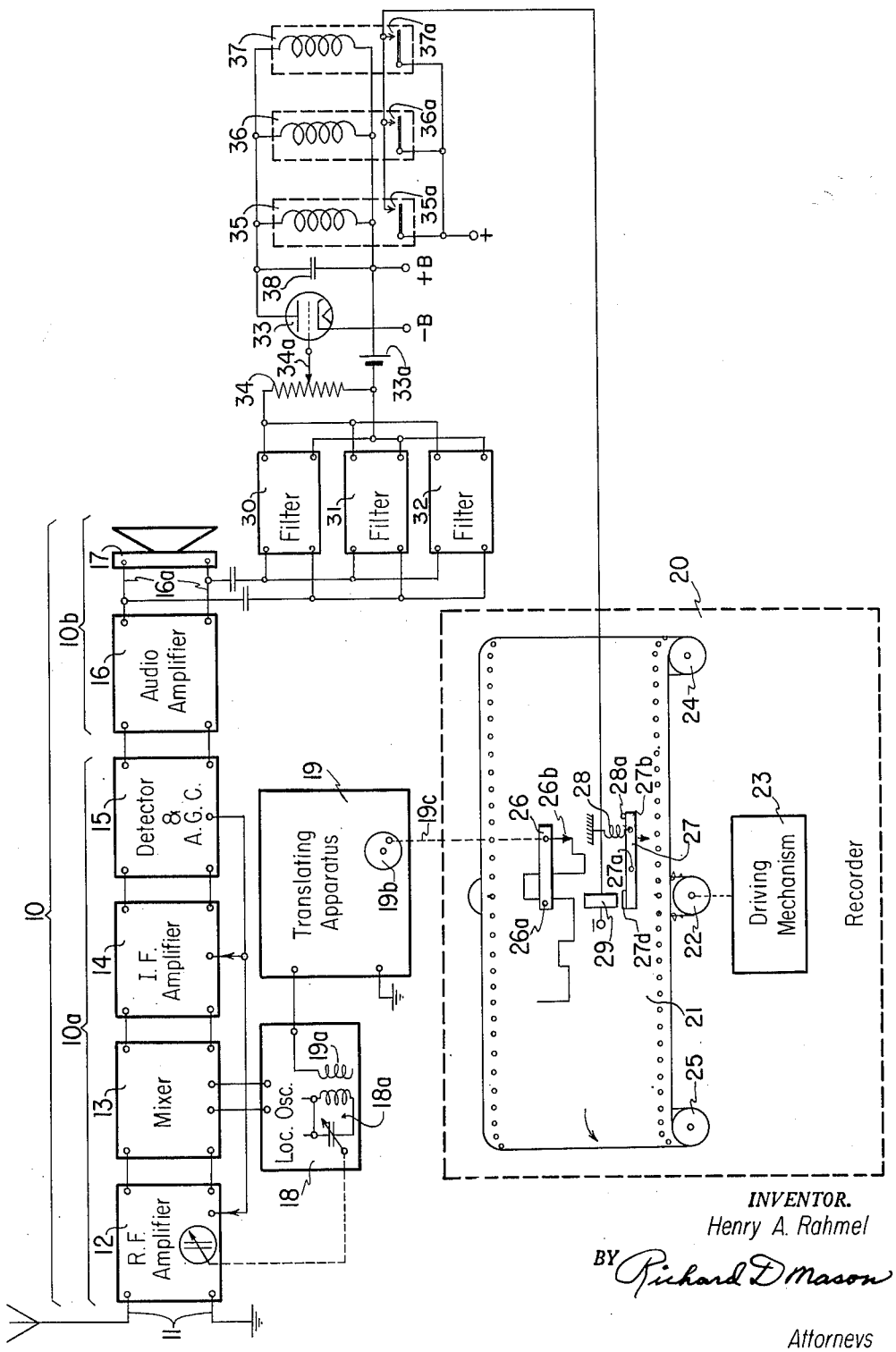
July 4, 1950 — H. A. RAHMEL — 2,513,360
SYSTEM FOR DETERMINING THE LISTENING
HABITS OF WAVE SIGNAL RECEIVER USERS
Filed Jan. 9, 1947
INVENTOR.
Henry A. Rahmel
BY Richard D Mason
Attorneys Patented July 4, 1950

UNITED STATES PATENT OFFICE 2,513,360

SYSTEM FOR DETERMINING THE LISTENING HABITS OF WAVE SIGNAL RECEIVER USERS

Henry A. Rahmel, Evanston, Ill., assignor to A. C. Nielsen Company, Chicago, Ill., a corporation of Illinois Application January 9, 1947, Serial No. 721,050

5 Claims. (Cl. 346—37)

The present invention relates to systems and apparatus for determining the listening habits of wave signal receiver users and more particularly to improved apparatus for correlating recorded indications of the wave signal transmitters from which programs are received at a wave signal receiver with the time of reception.

Instrumented methods of determining the listening habits of home radio receiver users involve the use of a recording device operated in conjunction with each collaborator receiver of the sampling system to record the extent of use of the receiver and to record, as a function of time, the wave signal transmitters to which the receiver is tuned for program reception. The usual device of this character embodies facilities for driving a recording element (a tape) at a constant speed and translating means for variable positioning a recording stylus relative to the recording element in accordance with changes in the tuning of the receiver. Times of recording program reception from particular transmitters are determined by the positions of the record indications along the recording element. Thus with a given starting time of the recording element accurately marked thereon, each following point along the recording element is representative of a later chronological instant so long as the recording element is driven at a constant speed. Hence to obtain accurate correlation of the record indications with time, it is essential that the recording element be driven at a precisely constant speed. This may be done with reasonable satisfaction by driving the recording element from a synchronous motor and by using a standby clock mechanism to take over the driving function during periods of power outages. In practice, however, the standby clock mechanisms sometimes fail to operate or operate imperfectly, which means that movement of the recording element is either stopped or the speed of movement is changed during such periods. The fact that this has occurred can be ascertained by observing that the length of the record on the recording element is less than it should be for the particular period which the record is supposed to represent. However, it is impossible to tell at what point along the record the stoppage or speed change of the recording element occurred. This means that the entire record must be discarded and that the cost of procuring the same is entirely wasted.

It is an object of the present invention, therefore, to provide in a system of the character described, improved facilities for more positively correlating with time the record indications identifying the particular transmitting stations from which programs are received.

According to another object of the invention, time signals of the character broadcast by most broadcast network transmitting stations at periodic intervals are utilized in the correlation of the record indications representing stations listened to with time.

In accordance with a further and more specific object of the invention, the time signals as derived from the low frequency section of the receiver with which the recording device is associated, are selected on a frequency basis and utilized to actuate facilities for directly recording the signals on the recording element of the device, whereby a recording element stoppage or speed change interval may be easily located between two time signals record marks on the recording element by checking the record on the element forward and backward from its respective ends.

The invention, both as to its organization and method of operation, together with further objects and advantages thereof will best be understood by reference to the following specification taken in connection with the accompanying drawing, in which the single figure illustrates the present improved recording apparatus as combined with a wave signal receiver of conventional type.

Referring now to the drawings and more particularly to Fig. 1 thereof, the present improved apparatus is there illustrated in combination with a wave signal receiver 10 adapted for conventional broadcast receiver use in the home of a collaborator in the sampling system and comprised of a high frequency section 10a followed by a low frequency section 10b. This receiver may be of any desired commercial type and is illustrated as being of the well known superheterodyne type. Briefly, it comprises an antenna-ground circuit 11, a tunable radio frequency selector and amplifier 12, a mixer or modulator 13, an intermediate frequency amplifier 14, a detector and automatic gain control unit 15, an audio frequency amplifier 16 and a transducer or loud speaker 17 connected in tandem in the order named. The usual local or beat frequency oscillator 18 is provided at the mixer stage 13 for heterodyning a received program signal carrier to a fixed intermediate frequency. To this end, the tunable frequency determining circuit 18a of the oscillator 18 is arranged to be gang tuned with the selective circuits of the radio frequency amplifier 12.

In general, the receiver 10, as described above, is entirely conventional in arrangement and its mode of operation is well understood in the art. Briefly, however, program modulated carrier signals intercepted by the antenna-ground circuit 11 are selected and amplified in the radio frequency amplifier 12, converted into a modulated carrier of fixed frequency in the mixer 13, further selected and amplified in the intermediate frequency amplifier 14, and detected in the detector and automatic gain control unit 15. The program or modulation components thus developed at the output side of the unit 15 are amplified by the audio frequency amplifier 16 and delivered over the voice coil leads 16a to the loud speaker 17 for reproduction. Automatic gain control of one or more of the receiver stages 12, 13 and 14 under the control of the gain control bias developed in the unit 15 is accomplished in an entirely conventional manner.

Although a single receiver has been described by way of illustration, it will be understood that in actual practice several hundred broadcast receivers located in homes within the radiation areas of different sets of wave signal transmitters broadcasting the particular programs of interest are employed to provide the record information concerning the listening habits of the receiver users necessary to a statistical analysis from which the factors affecting the sales effectiveness of particular programs may be accurately arrived at. In using the system, it is contemplated that selection of the system collaborator homes, i. e., the homes in which wave signal receiver use is to be logged, shall be on a basis such that all of the variable factors, such for example, as number of potential listeners, economic affluence, religion, etc., which normally affect any process of sampling public opinion are accounted for on an accurate statistical basis. In the interests of simplifying the disclosure, however, only a single wave signal receiver 10 and associated recording facilities has been illustrated in the drawings.

For the purpose of producing a readily analyzable record of the transmitting stations listened to at the respective collaborator receivers used in the system, each receiver is provided with means for utilizing a signal voltage derived from the local oscillator of the receiver to produce a graphical record of the extent of use of the receiver and the particular stations listened to during each use period. Briefly, this apparatus as provided in association with the collaborator receiver 10, comprises a tape recorder 20 and translating apparatus 19 for translating changes in the output frequency of the local oscillator 18 into corresponding movement of the recording stylus arm 26 transversely of the recording element 21. The translating apparatus 19 and associated recorder 20 may be of the form disclosed and claimed in Woodruff Patent No. 2,305,834, granted December 22, 1945, and assigned to the same assignee as the present invention, but preferably are of the improved form disclosed and claimed in co-pending application Serial No. 511,246 filed November 22, 1943, now Patent No. 2,483,573 granted October 4, 1949, Robert A. Clark and also assigned to the same assignee as the present invention. More specifically considered, the recorder 20 embodies a recording element in the form of a tape 21 movable between a supply spool 24 and a take-up spool 25 and driven at a constant speed by a sprocket 22 having spaced peripheral teeth engageable with edge perforations in the tape 21. Constant speed rotation of the sprocket 22 and hence constant speed movement of the tape 21 is obtained by shaft connecting this sprocket to a driving mechanism 23. This mechanism is comprised of a synchronous motor adapted for energization from any commercial source of alternating current of constant frequency and normally utilized to drive the sprocket 22 through a suitable clutch mechanism. The driving mechanism may further include a spring actuated standby clock device normally maintained in wound condition by the synchronous motor of the mechanism 23 and adapted to be connected in driving relationship with the sprocket 22 through electro-magnetic actuation of the clutch device in response to deenergization of the synchronous driving motor during a period of power failure. In addition to the stylus arm 26 which is pivoted as indicated at 26a for movement of the stylus end 26b thereof back and forth transversely of the tape 21, the recorder comprises a second stylus arm 27 which is pivoted at 27a and is provided with a stylus end 27b normally spring biased by means of a spring 28 against a stop 28a in a position such that the stylus does not contact the tape 21. An electromagnet 29 cooperating with an armature 27d mounted upon the stylus arm 27 at the opposite end thereof is utilized to pivot this arm against the bias of spring 28 until the stylus carried thereby engages the tape 21.

In detail, the translating apparatus 19 may be of the exact form disclosed in the above-identified Woodruff patent or co-pending Clark application. Briefly, however, it comprises a high frequency translating circuit excited from the tuning inductance of the local oscillator tank circuit 18a by means of a pick-up coil 19a inductively associated with this tuning inductance. The frequency of the voltage impressed across the input terminals of this translating circuit by the coil 19a is accurately representative of the signal carrier frequency at which program signals are being received from a distant wave signal transmitter. The purpose of the translating apparatus 19 is to convert changes in the output frequency of the local oscillator 18 into corresponding changes in the angular position of the stylus arm 26a relative to the moving tape 21. To this end, the translating apparatus includes facilities for accurately changing the angular setting of a rotatable crank arm or disc 19b in accordance with changes in the input frequency of the input or exciting voltage for the apparatus 19. This crank arm is connected by a suitable linkage mechanism 19c to pivot the stylus arm 26 about its pivot axis 26a during rotation of the arm 19b. In other words, predetermined angular settings of the crank arm 19b and hence the stylus arm 26 are representative with precision accuracy of predetermined output frequencies of the local oscillator 18 which in turn are accurately representative of the carrier frequencies at which program signals are received from distant transmitters.

During operation of the described apparatus, the tape driving mechanism 23 is maintained in continuous operation regardless of whether the receiver 10 is in use or not. The power circuits of the translating apparatus 19, on the other hand, are only energized and hence conditioned for operation when the receiver 10 is "turned-on" to condition the same for signal reception. It will be understood, therefore, that during a nonuse period of the receiver 10 the stylus carried by the arm 26 inscribes a straight line (or no line) upon the record tape 21. When, however, the receiver 10 is energized to condition the same for signal reception, the translating apparatus 19 is also energized. As a result, this apparatus functions to position the crank arm 19b in an angular setting representative of the output frequency of the local oscillator 18 and acts through the linkage mechanism 19c correspondingly to position the stylus arm 26 relative to the tape 21. Thus, as the receiver 10 is tuned for the reception of program signals originating at different transmitters operating on different carrier frequencies, the position of the stylus carried by the arm 26 is changed transversely of the tape. When thus operated to any position representative of signal reception from a particular transmitter, the stylus carried by the arm 26 inscribes a straight line on the tape 21 for the duration of signal reception from the particular transmitter. Hence the length of the line so inscribed is (due to the constant speed movement of the tape 21) representative of the time during which signals were received from the particular transmitter. Thus, over an extended recording interval (thirty days, for example), a record is formed which consists of a number of straight line segments spaced transversely of the tape, each of which is representative of a particular tuning setting of the receiver 10 and the lengths of which respectively represent the time periods during which the receiver occupied the respective tuning settings. By appropriate transverse calibration of the tape, therefore, the tape record may be decoded to obtain information concerning the stations listened to by the user of the receiver 10, the time of listening and the period of listening.

As will be apparent from the above explanation, accurate measurement of the factor time is dependent upon continuous and precisely constant speed of movement of the recording element or tape 21. However and as explained above, it has been found in practice that due to imperfections of the standby clock mechanism embodied in the driving mechanism 23, changes in the speed of movement of the recording element 21 or stoppage thereof may occur during periods of power outage when the synchronous driving motor of the mechanism is deenergized. Obviously, the segment of tape length used during an extended recording interval during which a tape speed change of the character described may occur, or the point along this length at which tape stoppage has occurred, is not indicated by the record produced by the station recording stylus carried by the arm 26. In other words, in checking the tape 21 at the central office (prior to decoding the record information inscribed thereon) for the purpose of determining the accuracy of timing, the starting time of the tape and the stopping time of the tape are known along with the standardized speed of tape movement. Hence, for the recording interval in question the amount of tape should have been used may be easily calculated. If upon checking the length of the tape segment actually used during the recording interval it is found that this length is shorter than the calculated tape length, a tape stoppage or period of tape slow-down during the recording interval is indicated. On the other hand, if the actual length of tape used is longer than the calculated length for the recording interval in question, an excessive speed of tape movement is indicated for at least a portion of the recording interval. This is all that can be determined since no information is inscribed on the tape to indicate when the tape stoppage or departure from the standardized speed of tape movement occurred. As a consequence, the entire tape must be discarded for the reason that the record information thereon cannot be accurately correlated with time.

In accordance with the present invention, the problem as outlined above is at least in part obviated by providing facilities, controlled through the signal channel of the receiver 10 and responsive to time signals traversing this channel, for controlling the stylus carried by the arm 27 of the recorder 20 to produce time signal record indications on the recording element 21. In this regard, it will be understood that the time signals originate at certain of the wave signal transmitters from which program signals may be regularly received by the receiver 10. More specifically, most if not all of the larger network transmitting stations broadcast time signals of a standardized audio frequency at periodic intervals. For example, the transmitters of a typical National Broadcasting Company network transmit time signals at a standardized frequency of 800 cycles per second regularly at quarter-hour intervals. Aside from network stations, many other so-called independent transmitting stations follow the same practice. Hence in the area in which a collaborator receiver such as the receiver 10 may be located, the probabilities are that two or more of the transmitters to which the receiver 10 is regularly tuned for program reception will be transmitters of the type which broadcast time signals at regular intervals.

Briefly, the facilities provided in the illustrated system to translate received time signals into record indications on the moving tape 21 comprise a plurality of filters 30, 31 and 32 having their input terminals connected in parallel and capacitively coupled to the voice coil leads 16a of the receiver 10. These filters are individually and respectively tuned sharply to three different audio frequencies at which time signals are broadcast from three different signal transmitters which carry time signals and are frequently listened to by users of the receiver 10. For example, if the filter 30 is to be used in passing time signals originating at a transmitter forming a part of a National Broadcasting Company network, it will be sharply tuned to pass signals of a frequency of 800 cycles per second and only that frequency. Conveniently, the second and third filters 31 and 32 may be used to pass time signals originating at network or non-network transmitting stations, within the radius of reception of the receiver 10.

The output terminals of the three filters 30, 31 and 32 are connected in parallel and coupled to the input electrodes of an amplifier tube 33 through a signal level control potentiometer comprising a resistor 34 bridged across the output terminals of the three filters and having a wiper 34a adjustable therealong. Normal operating bias between the input electrodes of the tube 33 is provided by a suitable biasing battery 33a. The output circuit of the tube 33 includes in parallel the three operating windings of three tuned reed relays 35, 36, and 37 bridged by a time delay condenser 38. These relays are tuned to respond to signal voltages passed by the filters 30, 31 and 32, respectively, and have parallel connected contacts 35a, 36a and 37a commonly controlling the energizing circuit for the stylus actuating magnet 29. With this arrangement, the relay 35 will only respond to signal voltages passed by the filter 30, the relay 36 will only respond to signal voltages passed by the filter 31 and the relay 37 will only respond to signal voltages passed by the filter 32. These filters and the tuned relays respectively controlled thereby through the amplifier tube 33 may be of any desired commercial construction.

As will be evident from the foregoing explanation, with the receiver 10 tuned for the reception of program signals from the particular wave signal transmitter transmitting time signals at periodic intervals of the frequency which the filter 30 is tuned to pass, these signals as they appear in the low frequency or audio section of the section 10b of the receiver 10 are impressed across the input terminals of the three filters 30, 31 and 32. The filters 31 and 32 act to reject these signals. The filter 30, on the other hand, passes the signals for amplification by the amplifier tube 33 to energize the operating windings of the three tuned relays 35, 36 and 37. Due to the tuning of these relays, only the relay 35 responds to this voltage to the extent necessary to close the circuit control contacts provided therein. In closing its contacts 35a, the relay 35 completes an obvious circuit for energizing the magnet 29. This magnet in attracting its armature 27b, rotates the arm 27 against the bias of the spring 28 to move the stylus carried by the arm 27 into engagement with the tape 21. Thus, a record indication is produced identifying the particular instant of time at which the signal is received. When the time signal terminates, the relay 35 is deenergized and opens its contacts 35a to deenergize the magnet 29, permitting the spring 28 to retract the arm 27 and thus end the mark being produced on the tape 21. In a similar manner, the relays 36 and 37 respond to time signals received by the receiver 10 from the transmitters to which these relays respectively correspond to produce time signal record indications on the tape 21. Due to the action of the filters 30, 31 and 32 and the frequency selective action of the three tuned relays 35, 36 and 37, these relays are prevented from responding to transient program signals of the particular frequency to which the relays are tuned which may appear in the audio section 10b of the receiver 10 during normal program reception.

From the above explanation it will be apparent that during a typical recording interval of extended duration, a number of time signals will be recorded along the tape 21. The spacing between these time signal record indications as measured in terms of time will, of course, depend upon the extent of use of the receiver 10 during those intervals when time signals are being broadcast from the three wave signal transmitters to which the relays 35, 36 and 37 respectively correspond. Obviously they will not be recorded regularly at quarter-hour intervals. On the other hand, if any extensive use is made of the receiver 10, at least one record indication will be produced upon the tape 21 during each 24 hour period.

With the time signal record indications thus produced on a tape 21, information is available from which a timing fault along the tape may be isolated in checking the tape for accuracy of time measurement. Thus, when the tape is removed from the recorder 20 and transmitted to the central office for checking and decoding, the first time check of the tape may indicate that at some point during the recording interval, the speed of tape movement either changed or tape movement was stopped. After this is ascertained, the time signal record indications may be utilized in rechecking the tape to determine at what point therealong the timing fault occurred. Thus and as indicated above, the time at which tape movement is started to initiate the recording interval is known. With this starting point as an index, the speed of tape movement to the first and succeeding recorded time signal indications may be checked. When a recorded time signal indication is found to be out of place along the tape on a chronological time basis, the time at which the timing fault started is indicated. The actual time at which the recording interval ended is also known. Accordingly, by using the recording time signal indications in checking the tape backward on a time basis, the end of the time fault can be accurately located. Thus the portion of the tape during which faulty timing occurred can be isolated and marked on the tape so that it may be disregarded during the tape decoding operation. It will thus be understood that by recording the time signals in the manner described and utilizing the time signal record indications to isolate a timing fault along the tape, the major portion of the tape may be decoded and the information recorded thereon used. This means that the tape can be salvaged, whereas in the absence of the described time signal record indications it would have to be discarded.

While one embodiment of the invention has been described, it will be understood that various modifications may be made therein which are within the true spirit and scope of the invention as defined in the appended claims.

I claim:

1. In a system for determining the listening habits of wave signal receiver users, a wave signal receiver tunable to receive program signals from a plurality of wave signal transmitters and adapted to receive time signals from at least one of said transmitters, a recorder including means for moving a movable recording element, means for producing record indications along said element identifying the stations from which programs are received by said receiver, and means controlled through at least a part of the signal channel of said receiver and responsive to said time signals for producing time signal record indications on said element.

2. In a system for determining the listening habits of wave signal receiver users, a wave signal receiver tunable to receive program signals from a plurality of wave signal transmitters and adapted to receive time signals from at least one of said transmitters, said receiver including a high frequency section followed by a low frequency section, a recorder including means for moving a movable recording element, means for producing record indications along said element identifying the stations from which program signals are received by said receiver, and means coupled to said low frequency section of said receiver and responsive to said time signals for producing time signal record indications on said element.

3. In a system for determining the listening habits of wave signal receiver users, a wave signal receiver tunable to receive program signals from a plurality of wave signal transmitters and adapted to receive time signals having a characteristic audio frequency from at least one of said transmitters, said receiver including a high frequency section followed by a low frequency section in which said time signals appear, a recorder including means for moving a movable recording element, means for producing record indications along said element identifying the stations from which program signals are received by said receiver, frequency selective means coupled to said low frequency section of said receiver and tuned to respond only to audio signals having said characteristic audio frequency, and means activated by the response of said frequency selective means to said time signals for producing time signal record indications on said element.

4. In a system for determining the listening habits of wave signal receiver users, a wave signal receiver tunable to receive program signals from a plurality of wave signal transmitters and adapted to receive time signals having a chararacteristic audio frequency from at least one of said transmitters, said receiver including a high frequency section followed by a low frequency section in which said time signals appear, a recorder including means for driving a recording element at a substantially constant speed, means for producing record indications along said element identifying the stations from which program signals are received by said receiver, frequency selective means coupled to said low frequency section of said receiver and tuned to respond only to audio signals having said characteristic audio frequency, and means activated by the response of said frequency selective means to said time signals for producing time signal record indications along said element.

5. In a system for determining the listening habits of wave signal receiver users, a wave signal receiver tunable to receive program signals from at least a portion of a plurality of wave signal transmitters, a recorder including means for moving a movable recording element, means for producing record indications along said element identifying the stations from which program signals are received, and means responsive to the operation of a predetermined one of said wave signal transmitters for producing time signal record indications along said element.

HENRY A. RAHMEL.

REFERENCES CITED

The following references are of record in the file of this patent:

UNITED STATES PATENTS

| Number | Name | Date |
| --- | --- | --- |
| 2,342,167 | Potter | Feb. 22, 1944 |